(12) United States Patent
Rambeau et al.

(10) Patent No.: US 9,059,774 B2
(45) Date of Patent: Jun. 16, 2015

(54) REDUCTION METHOD AND APPARATUS

(75) Inventors: Vincent Rambeau, Cormelles le royal (FR); Frederic Mercier, Saint Manvieu Morrey (FR); Luca Lo Coco, Anisy (FR)

(73) Assignee: NXP, B.V., Eindhoven (NL)

( * ) Notice: Subject to any disclaimer, the term of this patent is extended or adjusted under 35 U.S.C. 154(b) by 469 days.

(21) Appl. No.: 13/121,965

(22) PCT Filed: Oct. 7, 2009

(86) PCT No.: PCT/IB2009/054385
§ 371 (c)(1),
(2), (4) Date: Mar. 31, 2011

(87) PCT Pub. No.: WO2010/041202
PCT Pub. Date: Apr. 15, 2010

(65) Prior Publication Data
US 2011/0189959 A1 Aug. 4, 2011

(30) Foreign Application Priority Data
Oct. 7, 2008 (EP) .................................... 08290941

(51) Int. Cl.
*H04B 17/00* (2006.01)
*H04B 1/18* (2006.01)

(52) U.S. Cl.
CPC . *H04B 1/18* (2013.01); *H04B 17/21* (2015.01)

(58) Field of Classification Search
CPC ........... H04B 17/0062; H04B 17/0045; H04B 17/0057
USPC ......... 455/255, 256, 257, 258, 263, 266, 311, 455/317
See application file for complete search history.

(56) References Cited

U.S. PATENT DOCUMENTS

| 4,245,353 A | 1/1981 | Bynum |
| 4,843,636 A | 6/1989 | Hendriks et al. |

(Continued)

FOREIGN PATENT DOCUMENTS

| CN | 1518804 A | 8/2004 |
| WO | 2007/049099 A1 | 5/2007 |

OTHER PUBLICATIONS

International Search Report and Written Opinion for International Patent Appln. No. PCT/IB2009/054385 (Feb. 9, 2010).

*Primary Examiner* — Wen Huang

(57) ABSTRACT

The present invention relates to a tilt correction method and a corresponding apparatus for correcting tilt of RF signals in a wanted channel having a predetermined frequency range, in a signal path of a communication equipment, wherein the RF signals are down-converted to an intermediate frequency of an IF domain. The method comprises the steps of: providing a predetermined RF signal having a particular frequency to the signal path, detecting an output signal in the intermediate frequency (IF) domain and outputting a detection result, repeating the providing step and the detecting step for plural RF signals of different frequencies within the channel frequency range, determining the tilt of the RF signals in the frequency range by comparing the detection results, and correcting the tilt to obtain a minimized tilt of the wanted channel depending upon the determined tilt. The present invention further refers to a computer program including program code means to carry out the method, and to an integrated circuit wherein the apparatus is implemented.

20 Claims, 4 Drawing Sheets

(56) References Cited

U.S. PATENT DOCUMENTS

| | | | |
|---|---|---|---|
| 5,280,638 A | 1/1994 | Porambo et al. | |
| 5,606,735 A | 2/1997 | Ierfino | |
| 5,822,687 A | 10/1998 | Bickley et al. | |
| 6,603,810 B1* | 8/2003 | Bednekoff et al. | 375/228 |
| 6,766,150 B1 | 7/2004 | Johnson | |
| 6,778,023 B2 | 8/2004 | Christensen | |
| 7,302,461 B2* | 11/2007 | Mukherjee et al. | 708/819 |
| 7,315,731 B2* | 1/2008 | Nara | 455/226.1 |
| 7,437,139 B2* | 10/2008 | Lo et al. | 455/340 |
| 7,570,923 B2* | 8/2009 | Kiss et al. | 455/67.14 |
| 7,610,034 B2* | 10/2009 | Chang | 455/339 |
| 7,647,026 B2* | 1/2010 | Darabi | 455/67.13 |
| 7,983,644 B2* | 7/2011 | McMullin et al. | 455/255 |
| 8,135,094 B2* | 3/2012 | Gorday | 375/332 |
| 2002/0142745 A1 | 10/2002 | Kang | |
| 2003/0176174 A1* | 9/2003 | Seppinen et al. | 455/226.1 |
| 2003/0211836 A1 | 11/2003 | Khorram | |
| 2005/0003780 A1* | 1/2005 | Miyagi | 455/226.1 |
| 2005/0215217 A1* | 9/2005 | Birgenheier et al. | 455/226.1 |
| 2007/0093224 A1 | 4/2007 | Lo et al. | |

\* cited by examiner

REDUCTION METHOD AND APPARATUS

FIELD OF THE INVENTION

The present invention relates to the domain of transmission of radio frequency signals, and specifically to the reduction of a tilt of plural radio frequency signals in a selected transmission channel of a transmission system. The present invention further refers to a computer program comprising program code means for causing a computer to carry out the method, as well as an integrated circuit including the apparatus.

BACKGROUND OF THE INVENTION

In general, in radio frequency transmission systems (RF systems) communication equipment such as RF communication receivers (front-end circuitry) usually comprise in its signal path a RF front-end filter to suppress the power contained in unwanted transmission channels which are adjacent to a particular transmission channel which is the wanted channel. The suppression of power of the unwanted adjacent channels supports to meet linearity requirements of the RF communication receiver including the RF front-end filter, and benefits precise channel selectivity and reduces power consumption of the entire communication equipment in which the RF communication receiver is installed.

The RF communication equipment, and especially the terrestrial ones, have to cope with a large input frequency range (RF frequency range) which typically extents from 50 MHz to 1 GHz. This means that the filter must be a tracked band-pass filter (BPF) which needs to be accurately tuned at the wanted (desired) frequency, that is, at frequencies of the wanted channel. Most of the tuner devices use a super-heterodyne like architecture, according to which a RF signal (radio frequency signal) is down-converted into an intermediate frequency (IF). A local oscillator (LO) of the transmission system is generally a voltage-controlled oscillator (VCO) controlled by a PLL circuit (Phase Locked Loop circuit) and usually tuned by an external varactor. To track the radio frequency the RF filter must have a varactor which is of the same time as the VCO one, and the voltage applied on the VCO varactor must be applied on the RF filter varactor. In this case, the same technology for both the filter and the voltage controlled oscillator VCO is provided and leads to an accurate tracking over the whole frequency range. The parameter of interest, i.e. the power of the wanted channel can exactly be calibrated.

Patent document US 2003/0176174 discloses a method of operating a RF receiver (Radio Frequency receiver) of a communication equipment, wherein for calibration purposes a calibration signal is generated and is injected into a low noise amplifier of the RF receiver. The down-converted response of the receiver at a plurality of different frequencies of the calibration signal is measured. The measured response of the RF receiver represents the output power corresponding to each test signal of the calibration signal in the baseband, and after RF mixing is performed, it is determined, which of the results has produced the highest output power in the baseband. This process is, however, not sufficiently accurate and does not allow to take a decision in real time.

Moreover, signals are transmitted by the communication equipment according to a baseband with different frequencies. In receiving systems or communication equipment the signal paths (or at least a part of it) when transmitting signals of different frequencies often introduce a tilt in the wanted channel. In particular, the transmission of plural signals each having different frequencies may vary when the signal pass through the signal path, and the tilt is the variation of the signal amplitude in function of the frequency of the respective transmitted signal. That is, when two signals having different frequencies are handled and transmitted, and signal levels of such signals are measured, the difference between the measurements of the two signals having different frequencies represents the tilt of these signals. The tilt of the channel represents the difference between measurements of signals including a signal having the lowest possible frequency and a signal having the highest possible frequency.

In this connection, FIG. 4 shows a front-end circuitry 1 which is in general used to for handling and collecting input data and signals. The front-end circuitry 1 includes a filter unit which is provided in the form of a band-pass filter B. The band-pass filter B is adapted for filtering a frequency band depending upon a value of an applied control voltage for frequency selection (connection C). The front-end circuitry 1 may be arranged or implanted in a RF communication equipment, such as a mobile telephone.

Radio frequency signals to be handled by the front-end circuitry 1 are input to the input terminal IN and are treated by an input amplifier IA. The output signal of the input amplifier IA is transmitted to the filter B, and between the input amplifier IA and the filter B a connection point CP is provided at which a frequency signal $f_i$ can be injected. That is, the frequency signal $f_i$ is introduce into the signal path of the front-end circuitry 1 and input to the band-pass filter B.

A filter calibration unit FC is connected to the output terminal of the band-pass filter B for sensing the output signal thereof. The filter calibration unit FC provides the frequency signal $f_i$ to be input to the band-pass filter B, and also provides a further signal in the form of a control voltage which is input to the band-pass filter B for setting the band-pass filter B to a certain selected frequency.

The output signal of the band-pass filter B is mixed in a mixing unit M with a frequency signal $F_{LO}$ (from a local oscillator), and the resulting signal is fed to the rest FE of the front-end circuitry. This rest FE of the front-end circuitry provides an output for further data evaluation.

In the above-described front-end circuitry 1, when plural RF signals are handled with different frequencies within a particular channel, usually a tilt in such a wanted channel is introduced and leads to distortion of the signal evaluation and a degraded performance of the front-end circuitry 1.

In order to ensure a signal transmission (specifically a propagation through the signal path) with at least low distortion, and specifically for good channel reception, the tilt of the signals or of the transmission channel (wanted channel) should be minimized without affecting the group delay.

SUMMARY OF THE INVENTION

It is therefore the object of the present invention to provide a tilt reduction method and a reduction apparatus for minimizing the tilt in a wanted channel of transmission system.

According to the present invention, this object is accomplished by a tilt correction method and a corresponding apparatus as set out in the appended claims.

In particular, tilt correction method according to a first aspect of the present invention for correcting tilt of RF signals in a wanted channel having a predetermined frequency range, in a signal path of a communication equipment, wherein the RF signals are down-converted to an intermediate frequency of an IF domain, comprises the steps of providing a predetermined RF signal having a particular frequency to the signal path (step S1), detecting an output signal in the IF domain and outputting a detection result (step S2), repeating the providing step and the detecting step for plural RF signals of different frequencies within the channel frequency range (step S3), determining the tilt of the RF signals in the frequency range by comparing the detection results (step S4), and correcting the tilt to obtain a minimized tilt of the wanted channel depending upon the determined tilt (step S5).

According to the first aspect of the present invention, the tilt correction process is performed on the basis of a predetermined RF signal which has a certain frequency radio frequency RF). This signal is input to the communication equipment and is treated by the communication equipment. A corresponding output signal as a response to the input predetermined signal is sensed after down conversion to the IF domain which is a domain of an intermediate frequency. This process is reproduced, i.e. is repeated for further predetermined signals having other certain frequencies of the frequency range of the wanted channel. Based on the respective sensing results of the output signals (response signals) in the IF domain the tilt of the RF signals treated by the communication equipment is determined. The determination is performed by providing a comparison between the respective output signals concerned. Based on the determined tilt of the output signals a correction is then performed to minimize the tilt of the signals to obtain an optimized (reduced) tilt of the signals in the wanted channel, that is, a tilt of the signals propagating through the signal path of the communication equipment.

As a result, when the tilt of the RF signals in the predetermined frequency range (frequency range of the wanted channel) is corrected, the tilt is minimized so that a minimum of distortion when handling plural signals of different frequencies is obtained.

Preferred embodiments of the present invention are defined in the dependent subclaims.

The correction step (step S5) may further include a step of correcting the determined tilt by using a tunable filter unit that has adaptable positive or negative tilt. This ensure an easy and precisely controllable correction or setting of the tilt according to the detected propagating conditions of the RF signals in the signal path.

According to a second aspect of the present invention, the above providing step (step S1) may further include a step of generating the predetermined RF signals, and introducing the generated predetermined RF signals ($f_{inj}$) into the signal path. This enables the controlled provision of predetermined RF signals for precisely calibrating the properties of the signal path through which the signals are guided.

The method may further include a step of storing the detection results of the detecting step (step S2) for each of the predetermined RF signals under control of a control unit, and moreover, the step of determining the tilt (step S4) may include the step of comparing the stored detection results of each of the predetermined RF signals and determining the tilt based on the detected differences. Accordingly, the detection results, that is, the response signals of the signal path can be stored for RF signals having different frequencies laying within the frequency range of the wanted channel, and an easy comparison is ensured to obtain a tilt information in conjunction with the various generated RF signals.

According to a third aspect of the present invention, in the method according to the first aspect the providing step (step S1) may further include the step of sensing the wanted channel and selecting the predetermined RF signals having a certain frequency from the RF signals of the wanted channel. This ensure the provision of the predetermined RF signals (the propagation conditions of which are checked) based of incoming (input) RF signals out of the wanted channel, so that a specific generation of the predetermined signals is not necessary. At least some of the input signals are used for calibration of the signal path.

The sensing step of the third aspect of the present invention may include the step of controlling the bandwidth of a filter module to be small in comparison to the bandwidth of the wanted channel, and setting the frequency range of the bandwidth in accordance with the frequency of the predetermined RF signal to be selected. This ensures the precise selection of the respective predetermined RF signal of interest for determining the tilt. In the method according to the third aspect the repeating step (step S3) may further include the step of reiterating the selecting step for predetermined RF signals with several frequencies comprised in the wanted channel.

Moreover, according to a fourth step of the present invention the method (based on the first to third aspects) may further include a step of controlling a delay setting unit for correcting a group delay of the signal path. When in conjunction with a correction of the tilt of the plural RF signals the group delay has been changed then the modified group delay can be corrected to obtain a tilt correction without affecting the group delay of the RF signals. Therefor, in the method the controlling step may include the step of controlling the group delay of the signal path depending on the detected tilt of the predetermined RF signals. The tilt correction is obtained according to the present invention without affecting the group delay. That is, simultaneously with the minimizing of the tilt in the wanted channel the group delay can also be optimized.

According to a fifth aspect the present invention concerns a tilt correction apparatus for correcting tilt of RF signals in a wanted channel having a predetermined frequency range, in a signal path of a communication equipment, wherein the RF signals are down-converted to an intermediate frequency of an IF domain. The apparatus comprising: a signal path including a first filter module being adapted for selecting the wanted channel out of a plurality of channels, a second filter module having a predetermined bandwidth and being adapted for selecting a predetermined RF signal having a particular frequency, a detector being adapted for detecting an output signal of the signal path depending upon the predetermined RF signal and outputting a detection result, a control unit being adapted for at least controlling the first filter module to repeatedly provide the predetermined RF signal having the particular frequency, receiving and evaluating the detection result for plural predetermined RF signals each having a different frequency out of the frequency range of the wanted channel, by comparison, and correcting the tilt of the wanted channel depending upon the determined tilt.

In the apparatus according to the fifth aspect of the present invention the first filter module may be a tunable filter unit having adjustable positive or negative tilt, and the control unit may be adapted for adjusting the adjustable positive or negative tilt depending upon the detection result. The tunable filter ensures an easy and precisely controllable correction or setting of the tilt according to the detected propagating conditions of the RF signals in the signal path.

The apparatus may further comprise a generator for generating the predetermined RF signals each of the RF signals having a different frequency within the frequency range of the wanted channel and for introducing the generated RF signals into the signal path, wherein the generation of the predetermined RF signals is performed under control of the control unit. This enables the controlled provision of predetermined RF signals and introduction thereof into the signal path for precisely calibrating the properties of the signal path through which the signals are guided to optimize the tilt if the signal path.

According to a sixth aspect the present invention further concerns a computer program comprising program code means for causing a computer to carry out the steps of the method described above when the computer program is carried out on a computer.

According to a seventh aspect the present invention further concerns an integrated circuits including the above described apparatus for correcting tilt of RF signals in a wanted channel.

The present invention is further elucidated by the following Figures and examples, which are not intended to limit the scope of the present invention. Specifically, the above-mentioned and other aspects of the present invention will be apparent from and explained with reference to the embodiments and aspects of the present invention described hereinafter.

BRIEF DESCRIPTION OF THE DRAWINGS

In the following drawings.

DETAILED DESCRIPTION OF THE INVENTION

First Embodiment

Figure 1:
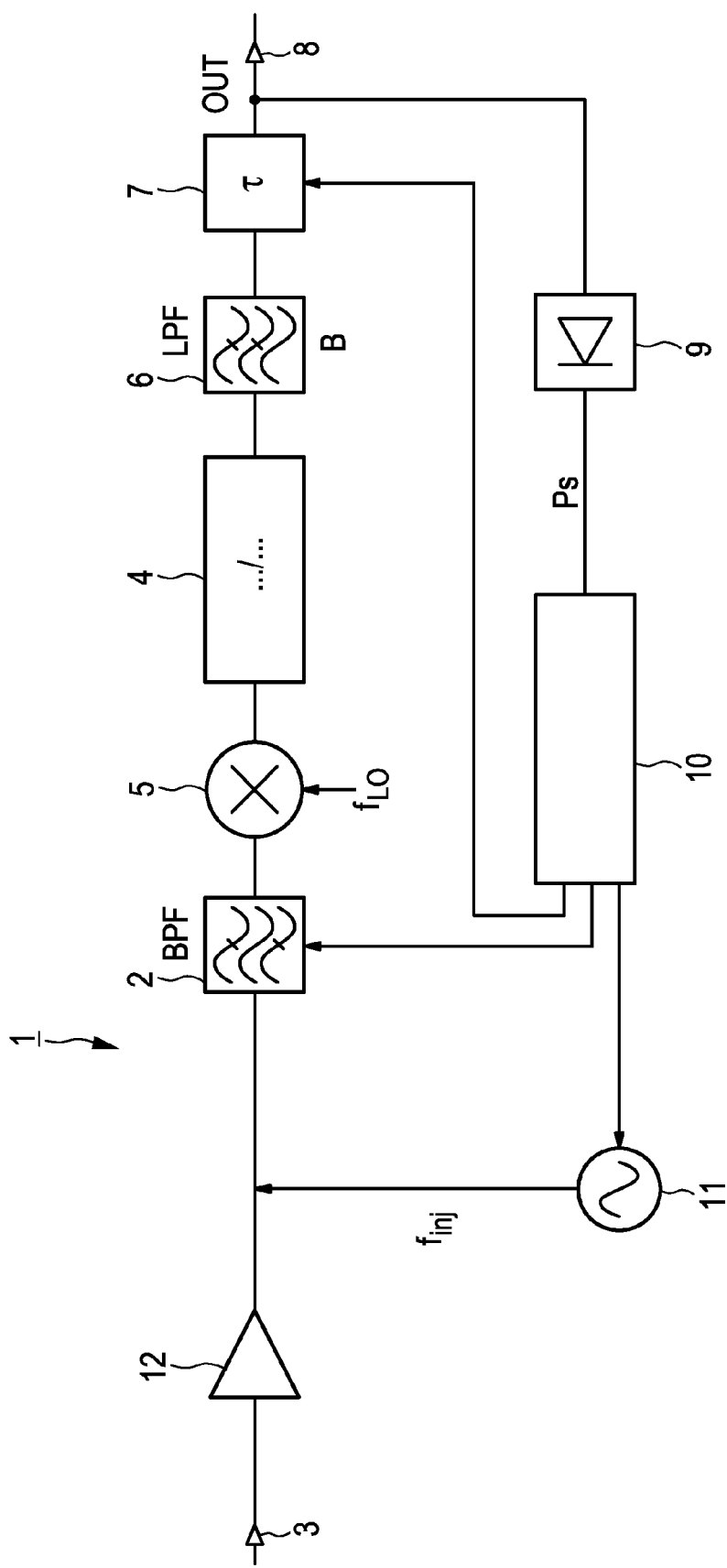
FIG. 1 shows a front-end circuitry with frequency signal injection according to a first embodiment of the present invention.

FIG. 1 shows the circuit arrangement (block circuit) of a front-end circuitry 1 according to the present invention.

The front-end circuitry 1 includes a first filter module 2 of a radio frequency filter (RF filter) provided in the form of a band-pass filter (BPF).

At an input terminal 3 the radio frequency signals (RF signals) are input. The RF signals are signals of different communication channels including a wanted channel to which the front-end circuitry 1 is to be set or tuned, and the signals have different frequencies within the respective frequency ranges of the respective communication channels.

The input RF signals are fed to the first filter module (band-pass filter) 2 for filtering particular signals, and are fed to a further circuitry 4 for signal evaluation. A mixing unit 5 is provided between the first filter module 2 and the further circuitry 4. The mixing unit 5 allows the introduction of a frequency signal $F_{LO}$ which is a frequency of a local oscillator (not shown). The frequency of the local oscillator is variable.

The output signal of the further circuitry 4 is fed to a second filter module 6 which can be provided in the form of a low pass filter with a predetermined bandwidth B.

The output of the second filter module 6 is input to a delay setting unit 7 and is then output as a corresponding output signal OUT at an output terminal 8. The output signal OUT represents a response signal based on a corresponding input RF signal.

The delay setting unit 7 is arranged in the signal path (signal transmission path). By mean of the delay setting unit 7 in a controlled manner the group delay of the complete front-end circuitry 1 can be modified under predetermined conditions. The output signal OUT of the delay setting unit 7 which represents the output signal of the front-end circuitry 1 is fed back to a detector 9 which is arranged for detecting properties of the output signal OUT, such as the power Ps thereof.

The detector 9 is connected to a control unit 10 (controller, control means) which is adapted for inputting and evaluating output signals Ps of the detector 9 indicative of, for example, the power of the output signals OUT of the front-end circuitry 1, and for generating control and instruction signals to be fed to various units and means of the front-end circuitry 1.

In particular, the control unit 10 is connected to the delay setting unit 7 to supply to the delay unit 7 an instruction signal for setting the group delay of the front-end circuitry 1 and the output signals OUT thereof.

Furthermore, the control unit 10 is connected to the first filter module (band-pass filter) 2 for sending instruction signals to the first filter module 2 for performing a resonance frequency selection in conjunction with the first filter module 2.

The control unit 10 is further connected to a generator 11 for generating predetermined signals, such as RF signals $f_{inj}$, having a specific frequency. The generated frequency signals $f_{inj}$ are provided for frequency signal injection between an amplifier unit 12 arranged in the signal path, and the first filter module 2. The amplifier unit 12 is arranged between the input terminal 3 and the first filter module 2. Moreover, the signal path is provided by the input amplifier 12, the first filter unit 2, the mixing unit 5, the further circuitry 4, the second filter unit 6 and the delay setting unit 7 between the input terminal and the output terminal 8.

Figure 4:
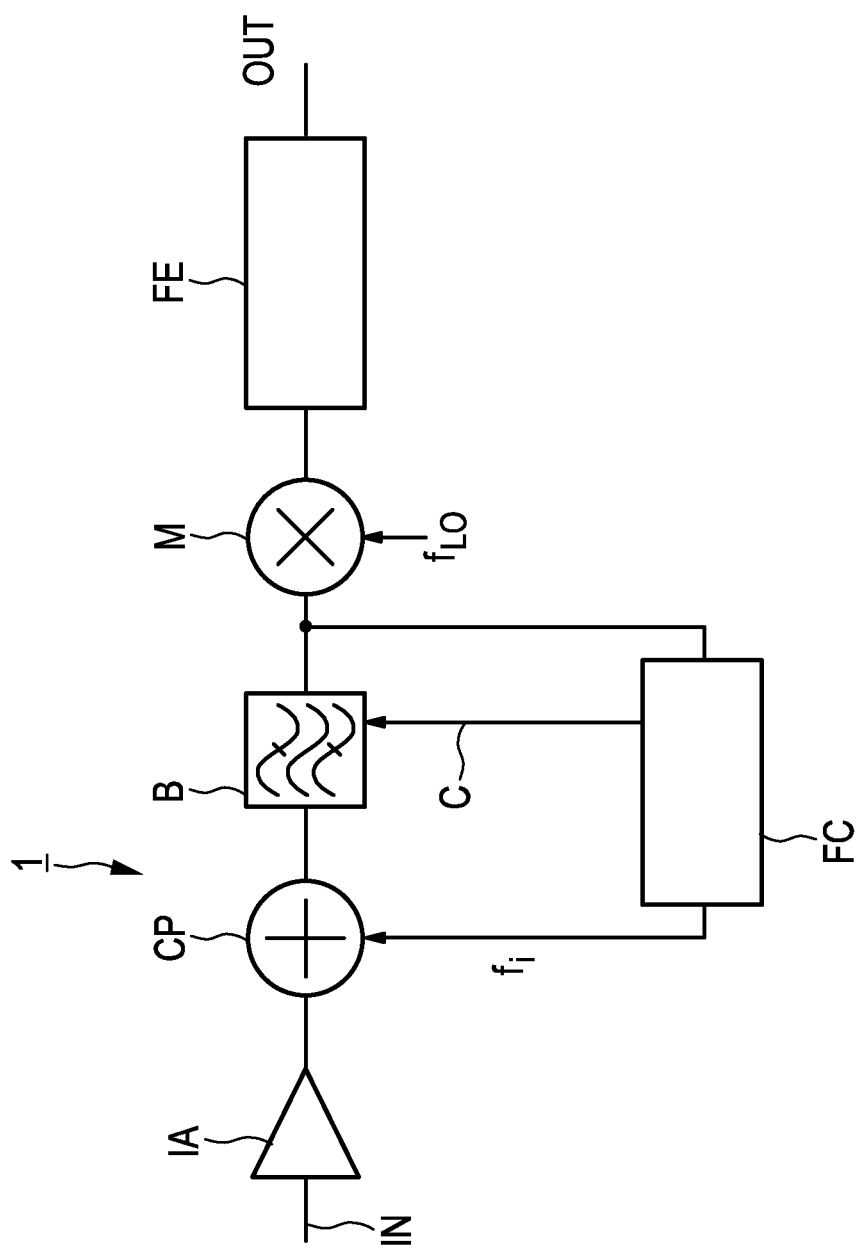
FIG. 4 shows a front-end circuitry including filter calibration according to the prior art.

The circuit arrangement of the front-end circuitry 1 as shown in FIG. 1 can be operated in the manner as described in the following. The mentioned steps of the method described refer to the flowchart as shown in FIG. 4.

Since the tilt of RF signals input to the front-end circuitry 1 is to be optimized, i.e. reduced or minimized, the properties or characteristics of the front-end circuitry 1 in view of the tilt of the RF signals are sensed. The front-end circuitry 1 can be set to a compensation mode which is an operation mode different from the normal operation mode of conducting signals through the respective signal path, and the control unit 12 outputs control or instruction signals to be fed to the generator 11 to generate a plurality of frequency signal $f_{inj}$ each having a predetermined frequency. That is, based on the instruction signals and, thus, under control of the control unit 10, a particular frequency signal $f_{inj}$ is introduced into the signal path between the input amplifier unit 12 and the first filter module 2 (Step S1).

The control unit 10 then provides a setting of the first filter module 2 to the frequency of the frequency signal $f_{inj}$ introduced into the signal path. The frequency of the frequency signal $f_{inj}$ is taken from the frequency range (frequency band) of the wanted channel which can be selected out of a plurality of available channels. That is, the frequency of the frequency signal $f_{inj}$ generated by the generator 11 and injected into the signal path is taken from a frequency range of the wanted channel extending from a lowest frequency to a highest frequency, defining this frequency range. The generated frequency signal $f_{inj}$ constitutes a predetermined signal with known or settable (adjustable) properties and can serve as a calibration signal for checking the signal path concerned.

The frequency signal introduced or injected into the signal path causes an output signal OUT which is detected by the detector 9 (Step S2), and a corresponding output signal Ps representing detection result, is fed to the control unit 10. Specifically, the detection is performed by the detector 9 in the intermediate frequency domain, that is, after down-conversion of the signals input or injected to an intermediate frequency domain (IF domain).

The detection result of the detector 9 is preferably stored in a specific memory range in the control unit 10 or in a separately provided memory (not shown in the Figures).

When a detection result has been obtained and stored, the control unit 10 issues a further instruction signal which is then fed to the generator 11 to generate a frequency signal $f_{inj}$ having a frequency which is different from the first frequency signal $f_{inj}$ generated and introduced (injected) into the signal path. The corresponding output signal in conjunction with the injected second frequency signal $f_{inj}$ is sensed and detected by the detector 9 and the corresponding detection results are stored in a corresponding manner. The frequency of the second frequency signal $f_{inj}$ is also included in the frequency range of the wanted channel.

In further steps the control unit 10 issues further instruction signals to the generator 11 for instructing (programming) a further frequency signal $f_{inj}$ having a different frequency in comparison to the frequency of the previous frequency signals $f_{inj}$, and also sends a resonance frequency selection signal to the first filter module 2 to obtain a filter performance of the first filter module 2 depending upon the frequency of the respective frequency signals $f_{inj}$. In particular, the steps of generating a frequency signal $f_{inj}$ having a certain frequency, injecting such a frequency signal, detecting the respective output signal thereof and storing the detection signal, are repeated (reproduced) for several different frequencies of the frequency range of the wanted channel (Step S3).

Finally, when a predetermined number of frequency signals $f_{inj}$ having different frequencies have been introduced into the signal path defined by the front-end circuitry 1, the stored detection results are compared with each other, and the tilt in the frequency signals $f_{inj}$ handled by the signal path in the frequency range of the wanted channel can be determined or deduced by comparison (Step S4).

This method allows the determination or detection of the tilt in the signals between particular ones of the predetermined signals, that is, signals based on certain frequencies, or the maximum tilt of the complete frequency range of the wanted channel.

The control unit 10 also functions as a tilt optimization unit and issues, depending upon the tilt detection result, corresponding setting or correction signals to the first filter module 2 provided in the form of the band-pass filter. The first filter module 2 constitutes a tunable filter unit which has an adjustable positive or negative tilt. Accordingly, the control unit 10 can adjust the adjustable tilt in such a manner, that the tilt of the frequency signals $f_{inj}$ having various frequencies and which are guided through the signal path of the front-end circuitry 1 has a minimized tilt (Step S5). The adaptation of the tilt, which corresponds to a correction of the tilt, is based on the detection results (detection information) of the various output signals detected by the detector 9, being stored under control of the control unit 10 and being evaluated by comparison. The tilt correction of the signal path represents a calibration thereof depending on the criteria of actual tilt of frequency signals $f_{inj}$ handled and, thus, include a testing of the properties of the front-end circuitry 1.

In addition to the capability of tilt optimization, the control unit 10 also has the capability of group delay of optimization.

Specifically, when the tilt has been adjusted according to the principles and tilt reduction method mentioned above, this in general has an influence on the group delay of the front-end circuitry 1. To this end, in addition to the tilt optimization the control unit 10 uses the connection to the delay setting unit 7 to perform a delay optimization. Hence, when also the group delay of the frequency signals $f_{inj}$ of the signal path of the front-end circuitry 1 is optimized, the signal path of the front-end circuitry 1 is optimized in both aspects of tilt and group delay, thereby resulting in an optimized signal path with low distortion and low deformation of signals guided through this signal path.

In this connection, the group delay can be adapted or set independently from the tilt optimization, and can be set in conjunction with and, therefore, in addition to the setting or correction of the tilt of the signals. That is, the correction or optimization concept of both measures may be performed independent from each other or in combination, depending upon the prevailing conditions of the signal path and the available signals.

The control concept of tilt optimization and delay optimization is preferably performed under control of the control unit 10, and in a still preferred manner the control unit 10 includes a corresponding software or a computer program implemented therein, to perform the concepts and principles of tilt optimization and delay optimization as described above.

Accordingly, the above-described concept of tilt optimization is based on the controlled generation of particular frequency signals $f_{inj}$ each of the frequency signals $f_{inj}$ having a frequency other than that of any other frequency signal $f_{inj}$, so that a variety of signals of different frequencies are guided through the signal path of the front-end circuitry.

Second Embodiment

Figure 2:
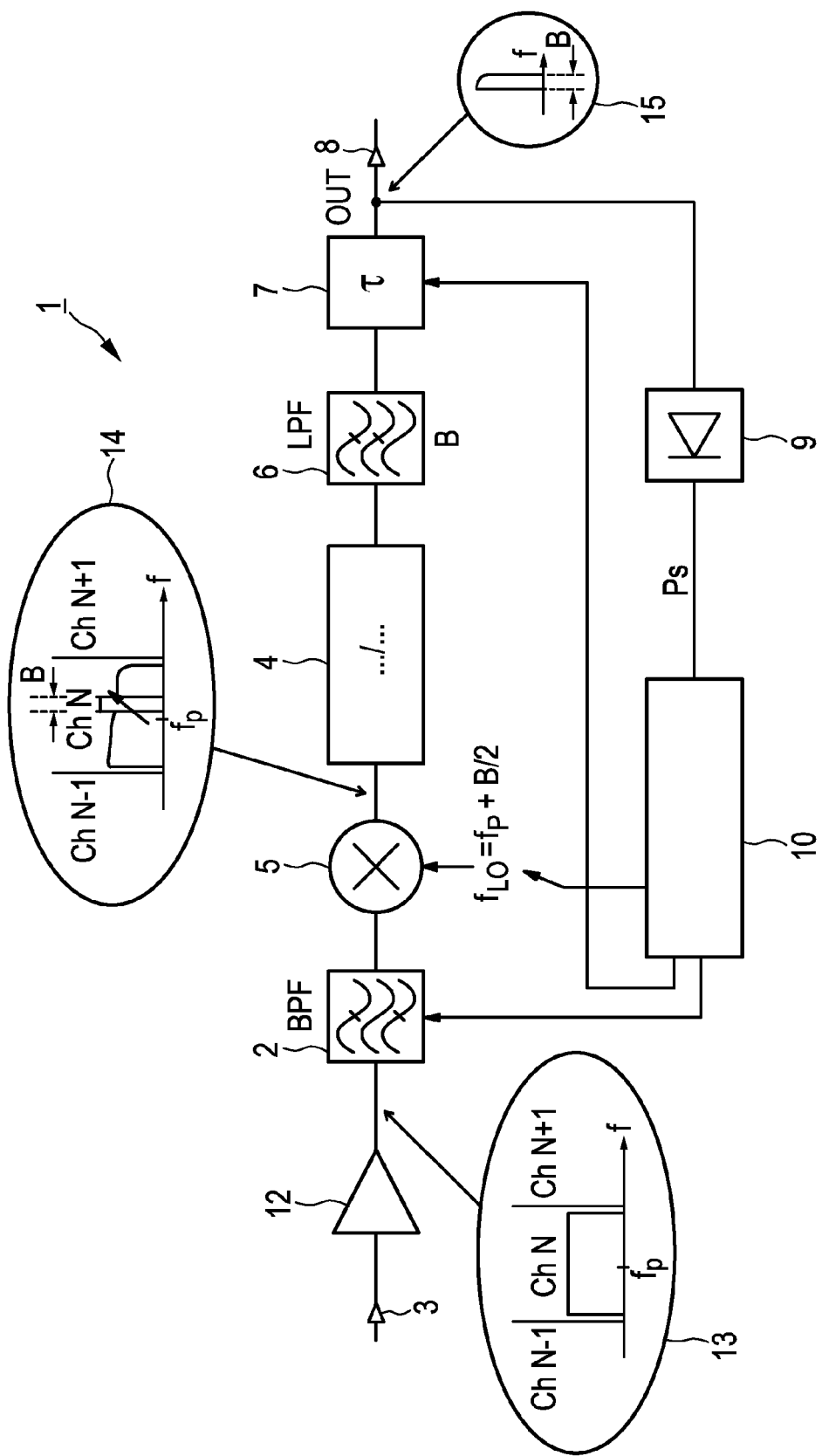
FIG. 2 shows a front-end circuitry with resonance frequency selection according to a second embodiment of the present invention.

FIG. 2 shows a second embodiment of the present invention which basically involves the same elements which are shown in FIG. 1, and corresponding elements are given the same reference number and detailed explanation is omitted.

According to the block circuit shown in FIG. 2 of the second embodiment the optimization concept includes, in a similar manner as it is the case according to the first embodiment, a tilt optimization performance and a group delay optimization performance. Both technical measures can be performed independently from each other or in addition to the respective other technical measure.

As it is already basically known from the block circuit of FIG. 1, FIG. 2 shows a signal path of a front-end circuitry 1 which is defined by an input terminal 3, an input amplifier unit 12, a first filter module 2 being preferably implemented by a band-pass filter (BPF), a mixing unit 5, a further circuitry 4 including further circuits, means or devices of the signal path for signal evaluation, a second filter module 6 being preferably based on a low path filter (LPF) having a bandwidth B, a delay setting unit 7 and an output terminal 8. The first filter module 2 (band-pass filter BPF) constitutes a filter unit having an adjustable positive or negative tilt, thereby representing a tunable filter. Moreover, the delay setting unit 7 involves the possibility of setting the group delay, so that, based on the conditions of the signal propagation, the group delay can be modified and optimized.

Specifically, the output signal, such as, for example, output signal OUT in FIG. 2 is sensed and detected by the detector 9, the detection being performed in the intermediate frequency domain (IF domain).

In a similar manner as it has been described in conjunction with the first embodiment, the output signals Ps of the detector 9 representing, for example, power of the output signals, are fed to a control unit 10 under control of which the detection result of the detector 9 is stored and can be evaluated. The control unit 10 is adapted for performing a tilt optimization and the delay optimization, and to this end, the control unit 10 is connected to the first filter module 2 to perform the tilt optimization, and to the delay setting unit 7 for performing the group delay optimization. Corresponding instruction signals are generated in the control unit 10 and are submitted to the first filter module 2 or the delay setting unit 7, respectively.

The operation of the tilt correction device according to the second embodiment of the present invention is described in the following.

At the input terminal 3 a variety of signals in different channels is available. Each channel has a predetermined frequency range, and a frequency $f_P$ is basically a medium frequency in the respective frequency range of a particular channel.

For example, from a plurality of channels (Ch) available at the input terminal 3 three channels N−1, N and N+1 are considered. Channel N represents the wanted channel. The wanted channel N has the predetermined frequency range at the predetermined frequency $f_P$. After down-conversion to the intermediate frequency (IF domain) the wanted channel N is sensed and signals thereof are evaluated. The first filter module 2 which represents a tunable band-pass filter for adjusting positive or negative tilt, is set to a predetermined frequency based on a bandwidth B, and a frequency signal corresponding to the bandwidth B and a certain position in the complete frequency range of the wanted channel is selected based on a corresponding setting of the first filter module 2. The first filter module 2 is set to let pass frequency signals (RF signals) of the frequency range of the wanted channel N. The setting is performed by means of corresponding instruction signals transmitted from the control unit 10 to the first filter module 2. The wanted channel N and a particular frequency signal thereof is selected.

At the mixing unit 5 a frequency signal is introduced into the signal path having a frequency of $f_{LO}=f_P+P/2$, wherein this frequency signal results from the local oscillator. This is performed under control of the control unit 10.

The second filter module 6 (low pass filter) is provided as a low pass filter the bandwidth B of which is chosen small compared to the bandwidth of the channel, so that an accurate measurement of a frequency point (frequency signal) of the wanted channel N can be carried out. In this connection, while as shown in FIG. 2 a first channel information 13 depicts the three channels available at the input terminal 3 from among a plurality of channels, the second channel information 14 shows the selected (filtered) wanted channel N and a particular frequency signal in the bandwidth B and the frequency arranged within the limit of the frequency range of the wanted channel N. The third channel information represents a signal information at the output of the front-end circuitry 1 (in more detail, the output signal of the delay setting unit 7) which represents the bandwidth B and the properties or specifically the response signal based on the corresponding frequency signal.

Figure 3:
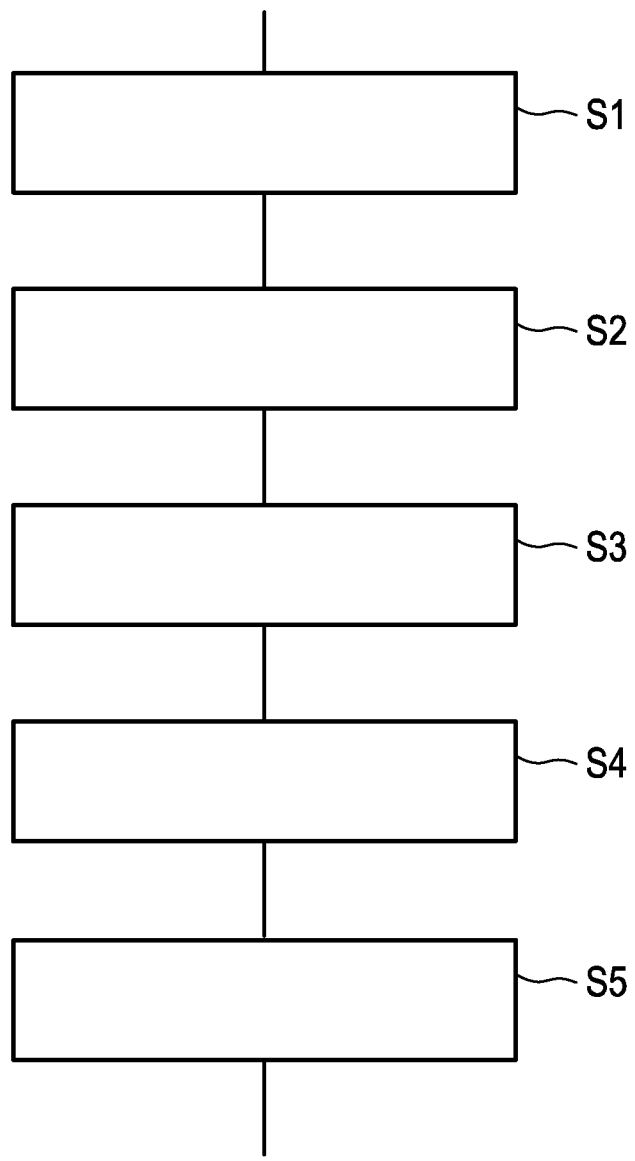
FIG. 3 shows a flow chart of the method

The detector 9 detects from this output signal OUT the properties of the response signal based on the selected frequency signal of the wanted channel N by setting the first filter module 2, and under control of the control unit 10 the detection result is stored. Accordingly, a test or calibration signal to be used for determining the properties of the signal path, specifically the tilt thereof, is taken from the signals included in the wanted channel N. This results in performing steps S1 and S2 of the flow chart of FIG. 3.

For determining the tilt of the signal path of the front-end circuitry 1 as shown in FIG. 2, the first filter module 2 is set by the control unit 10 to another frequency having the bandwidth B, resulting in the consideration of a further frequency signal having a basically the same bandwidth but another frequency or frequency range of the possible frequencies of the wanted channel N.

The further frequency signal resulting from a different setting of the first filter module 2 is guided through the signal path, and the output signal is then evaluated by the detector 9 to detect the properties of interest of the output signal (response signal). The detection result, that is, the output signals of the detector 9 are stored in or at least under control of the control unit 10.

The steps of determining the tilt of the signal path of the front-end circuitry 1 of FIG. 2 discussed so far are repeated for different setting of the first filter module 2 resulting in the provision of different frequency signals to the front-end circuitry 1 and involving the possibility to measure each response signal or output by the detector (Step S3). The detection result for every examined or checked frequency signal is stored in the above-mentioned manner under control of the control unit 10.

The detection results provided by the detector 9 include an information about the tilt of the signals and, thus, of the signal path of the front-end circuitry 1, and the tilt is determined on the basis of the stored information by comparison (Step S4). Hence, comparison is performed on the detection results of several frequency signals (with different frequencies) which are included in the wanted channel N and are, upon specific setting of the first filter module 2, introduced into the signal path of the front-end circuitry 1 according to the present invention.

This can be done by changing the frequency of the local oscillator (local oscillator frequency) $f_{LO}$.

Based on the detection results of the detector 9 and the corresponding stored information the control unit 10 tunes the first filter module 2 to adjust the tilt to obtain a minimized tilt (Step S5).

Since adjusting (minimizing) the tilt may also have an effect on the group delay of signals passing through the signal path of the front-end circuitry 1, the control unit 10 may also submit control signals or instruction signals to the delay setting unit 7 for tuning the delay setting unit 7, thereby also setting and optimizing the group delay of the front-end circuitry 1.

Similar to the first embodiment, the tilt optimization by tuning the first filter module 2 and the group delay optimization by tuning the delay setting unit 7 can be performed in combination or separately and independently from the respective other optimization process. Therefore, both the tunable first filter module 2 as well as the delay setting unit 7 can be instructed to optimize both entities.

The tilt reduction method (and the corresponding apparatus) according to the first and the second embodiments is based on the provision of different frequency signals, that is, according to the first embodiment by generating different frequency signals, and by selecting different frequency signals according to the second embodiment from the signals available in the wanted channel, and to use the response signals (output signals) of the various frequency signals to determine the tilt of the signal path of the front-end circuitry 1. The process of checking the signals is repeated several times, and the corresponding detection results are stored. Based on the detection results, the tilt is determined, and the tilt is adjusted and specifically minimized by providing a tuning operation at the first filter module 2, representing a filter module having an adjustable positive or negative tilt. In addition thereto (or independent there from) the group delay can be adjusted by correspondingly driving the delay setting unit 7. The tilt reduction constitutes a setting or calibration of the front-end circuitry 1 of the communication equipment.

Hence, both items, that is the tilt and the group delay of the signals can be optimized in an easy and precise manner according to the first and second embodiments of the present invention.

Similar to the first embodiment, the control concept, that is the tilt optimization and the group delay optimization can be performed based on a computer program which is stored in the control unit 10 or which can at least be handled by the control unit 10 when provided from the outside (for example from a host computer).

The tilt reduction apparatus as described above can be implemented in an integrated chip or integrated circuit (IC), or in a plurality of such integrated circuits.

For good channel reception it is desirable to have the tilt minimized without affecting the group delay. A favorable result of this demand can be obtained by the circuit arrangements and the methods described above according to the present invention.

The circuit arrangements according to FIGS. 1 and 2 of the present invention can be applied in any communication or transmission system and all types of communication equipments representing applications which need to minimize the tilt in the channel. The concept according to the present invention, therefore, requires a calibration signal or a digital reception like an OFDM standard (OFDM: Orthogonal Frequency Division Multiplex). For an instance, tilt correction method and corresponding apparatus can be used in all receiving systems specifically in silicon tuners for analog and terrestrial off-air or analog and digital cable TV reception.

While the present invention has been illustrated and described in detail in the drawings and the forgoing description, such illustration and description are to be considered illustrative or exemplary and the present invention is not limited to the disclosed embodiments.

Other variations to the disclosed embodiments can be understood and effected by those skilled in the art in practicing the claimed invention from study of the drawings, the disclosure and the appended claims. In the claims, the wording "comprising" does not exclude other elements or steps, and the indefinite article "a" or "an" does not exclude the plurality.

It is further to be noted that the drawings are of an exemplary nature and only show the structure and dimensions in a schematic manner, and the present invention is not limited to the exemplary dimensions, sizes and shapes of the components of the present invention. Any reference signs in the claims are not to be construed as limiting the scope of the present claims.

A computer program may be stored/distributed on a suitable medium, such as an optical storage medium or a solid-state medium supplied together with or as part of other hardware, but may also be distributed in other forms, such as via the Internet or other wired or wireless telecommunication systems.

The invention claimed is:

1. Tilt correction method for correcting tilt of RF signals in a wanted channel having a predetermined frequency range, in a signal path of a communication equipment, wherein the RF signals are down-converted to an intermediate frequency of an IF domain, the method comprising the steps of:
   providing a predetermined RF signal having a particular frequency to said signal path,
   detecting an output signal in the IF domain and outputting a detection result,
   repeating said providing step and said detecting step for plural RF signals of different frequencies within the channel frequency range,
   determining the tilt of said RF signals in the frequency range by comparing the detection results, wherein the tilt corresponds to an amplitude variation between the RF signals, and
   correcting the determined tilt, including the amplitude variation between the RF signals, to obtain a minimized tilt of said wanted channel depending upon the determined tilt.

2. Method according to claim 1, wherein said correction step includes the step of correcting the determined tilt by using a tunable filter unit that has adaptable positive or negative tilt.

3. Method according to claim 1, wherein said providing step includes generating said predetermined RF signals, and introducing said generated predetermined RF signals into said signal path.

4. Method according to claim 1, further comprising a step of storing the detection results of said detecting step for each of said predetermined RF signals under control of a control unit.

5. Method according to claim 4, wherein the step of determining the tilt includes the step of comparing the stored detection results of each of said predetermined RF signals and determining the tilt based on detected differences.

6. Method according to claim 1, wherein said providing step further includes:
   sensing RF signals in the wanted channel, and
   selecting said predetermined RF signals from the RF signals of said wanted channel.

7. Method according to claim 6, wherein said sensing step includes controlling a bandwidth of a filter module to be small in comparison to a bandwidth of the wanted channel, and setting the frequency range of said bandwidth in accordance with the frequency of the predetermined RF signal to be selected.

8. Method according to claim 6, wherein said repeating step further includes reiterating said selecting step for predetermined RF signals with several frequencies in said wanted channel.

9. Method according to claim 1, further comprising the step of controlling a delay setting unit for correcting a group delay of said signal path, the group delay being a delay common to each of the RF signals on the signal path.

10. Method according to claim 9, wherein said controlling step includes controlling said group delay of said signal path depending on the determined tilt of the predetermined RF signals.

11. A non-transitory computer readable storage medium including a computer program comprising program code for causing a computer to carry out the method of claim 1 when said computer program is carried out on a computer.

12. Method according to claim 1, wherein the determining of the tilt of said RF signals in the frequency range includes: comparing the detection results to each other to determine a difference in amplitude.

13. Method according to claim 1, wherein the correction step includes:
   correcting the determined tilt by using a tunable filter unit that has adaptable positive or negative tilt; and
   controlling a group delay of the signal path depending on the determined tilt of the predetermined RF signals, the group delay being a delay exhibited by each of the RF signals on the signal path.

14. Tilt correction apparatus for correcting tilt of RF signals in a wanted channel having a predetermined frequency range, in a signal path of a communication equipment, and wherein the RF signals are down-converted to an intermediate frequency of an IF domain, the apparatus comprising:
- a signal path including a first filter module being adapted for selecting the wanted channel out of a plurality of channels,
- a second filter module having a predetermined bandwidth and being adapted for selecting a predetermined RF signal having a particular frequency,
- a detector being adapted for detecting an output signal of said signal path depending upon said predetermined RF signal and outputting a detection result, and
- a control unit configured and arranged to:
  - control said first filter module to repeatedly provide said predetermined RF signal having the particular frequency,
  - receive detection results for plural predetermined RF signals, each having a different frequency of said wanted channel,
  - determine the tilt of the RF signals in said wanted channel by comparing the detection results to each other to determine a difference in amplitude, wherein the tilt corresponds to an amplitude variation between the RF signals, and
  - correct the determined tilt, including the amplitude variation between the RF signals, of said wanted channel depending upon the determined tilt.

15. Apparatus according to claim 14, wherein said first filter module is a tunable filter unit that has adjustable positive or negative tilt, and said control unit is further configured and arranged to adjust said adjustable positive or negative tilt depending upon the detection result.

16. Apparatus according to claim 14, further comprising a generator circuit configured and arranged to generate said predetermined RF signals, each of the RF signals having a different frequency within the frequency range of the wanted channel, and introduce the generated predetermined RF signals into the signal path, wherein the generation of the predetermined RF signals is performed under control of the control unit.

17. Integrated circuit including the apparatus for correcting tilt of RF signals in a wanted channel according to claim 14.

18. An apparatus for adjustment of tilt and delay of RF signals in a wanted channel having a predetermined frequency range, the apparatus comprising:
- a signal path including a first filter module configured and arranged to pass RF signals in a bandwidth of the wanted channel out of a plurality of channels, the first filter module having an adjustable tilt;
- a mixer coupled to the first filter module and configured and arranged to down convert RF signals passed by the first filter module to an intermediate frequency;
- a second filter module having an input coupled to an output of the mixer, having a predetermined bandwidth, and being adapted for selecting an RF signal having a particular frequency;
- a delay unit coupled to an output of the second filter module and configured and arranged to adjust a delay of RF signals output by the second filter module;
- a detector configured and arranged to detect an output signal of the delay unit depending upon the RF signals, and output a detection result; and
- a control unit configured and arranged to
  - determine the tilt of the RF signals in said wanted channel by comparing the detection results of the RF signals to each other to determine a difference in amplitude,
  - adjust the tilt of the first filter module based upon the determined tilt to reduce the tilt of the RF signals, and
  - use the delay unit to remove any change in delay of the RF signals caused by the adjustment of the tilt of the first filter module.

19. The apparatus of claim 18, further comprising a generator circuit configured and arranged to
- generate predetermined RF signals, each of the predetermined RF signals having a different frequency within the frequency range of the wanted channel, and
- introduce the generated predetermined RF signals into the signal path.

20. The apparatus of claim 18, wherein the control unit is configured and arranged to adjust the delay of the delay unit based on the determined tilt.

* * * * *